United States Patent
Ross

(10) Patent No.: US 6,342,130 B1
(45) Date of Patent: Jan. 29, 2002

(54) METHOD OF TREATING A BASE MATERIAL FOR OBTAINING SPECIFIC PROPERTIES

(75) Inventor: Robert Ross, Ede (NL)

(73) Assignee: N.V. Kema, AR Arnhem (NL)

(*) Notice: Subject to any disclaimer, the term of this patent is extended or adjusted under 35 U.S.C. 154(b) by 0 days.

(21) Appl. No.: 09/367,844

(22) PCT Filed: Feb. 10, 1998

(86) PCT No.: PCT/NL98/00080

§ 371 Date: Oct. 29, 1999

§ 102(e) Date: Oct. 29, 1999

(87) PCT Pub. No.: WO98/39092

PCT Pub. Date: Sep. 11, 1998

(30) Foreign Application Priority Data

Mar. 3, 1997 (NL) ............................................. 1005418

(51) Int. Cl.$^7$ ................................................. H05F 3/00
(52) U.S. Cl. .............. 204/164; 422/186.05; 422/186.06
(58) Field of Search ..................... 204/164; 422/186.05, 422/186.06

(56) References Cited

U.S. PATENT DOCUMENTS

| | | | |
|---|---|---|---|
| 3,652,244 A | 3/1972 | Plumat | |
| 3,850,605 A | 11/1974 | Maltman et al. | |
| 5,427,662 A | * 6/1995 | Ross | 205/688 |
| 5,443,703 A | * 8/1995 | Blitshteyn | 204/165 |
| 5,753,193 A | * 5/1998 | Slootman et al. | 422/186.26 |

FOREIGN PATENT DOCUMENTS

| | | |
|---|---|---|
| EP | 0 323 006 | 7/1989 |
| FR | 2.174.059 | 10/1973 |
| FR | 2693210 | 1/1994 |
| GB | 1060874 | 3/1967 |
| JP | 58-27367 | 2/1983 |
| JP | 6-28914 | 2/1994 |
| WO | WO 92/20728 | 11/1992 |

* cited by examiner

*Primary Examiner*—Kathryn Gorgos
*Assistant Examiner*—Wesley A. Nicolas
(74) *Attorney, Agent, or Firm*—Foley & Lardner

(57) ABSTRACT

Method of treating a base material for obtaining one or more specific properties, excluding ionomeric properties by diffusing a specific substance into the base material. The base material can be a synthetic or natural polymer, a ceramic material, an oil or grease-like substance, a gel, a paste, a glass substance, a liquid, a coating, a composition of materials, comprising a multi-layer system of substances, a fractal composition of substances, or a composite. The base material is contacted with an electrically conductive medium, and the specific substance is diffused in the base material under the influence of an electric field being applied across the whole of base material, electrically conductive medium and specific substance.

15 Claims, No Drawings

METHOD OF TREATING A BASE MATERIAL FOR OBTAINING SPECIFIC PROPERTIES

The invention relates to a method of treating a base material for obtaining one or more specific properties by diffusing a specific substance into the base material, said substance directly or indirectly inducing the specific property or properties.

Diffusing a foreign material into a base material in order to modify it, is known per se. Among other things, doping of semiconductors in order to give them a p- or n-type conductivity is known. There, diffusing of "impurities" takes place from the gas phase.

In U.S. Pat. No. 5,427,662 corresponding to the international patent application WO92/20728 (corresponding to Dutch patent application 91 00815) from the same inventor, a method is disclosed for producing an ionomer. According to said method a plastic is provided, an electrically conducting medium placed in contact with a plastic surface of said plastic, and an electrical field applied over the plastic surface. By the influence of the electrically field, in the presence of the electrically conducting medium, groups are radicalized or ionized from external and/or internal plastic surface in the direction of the electrical field in the plastic, which groups are converted as a result for instance of oxidation reactions into for example carboxylic acids or sulphonic acids. As an electrically conducting medium both liquids and gases can be used. If the electrically conducting medium has an inherent insufficient activity, reactive components can be added to the medium and/or the plastic such as reactive gases, for promoting the radical—forming or ion-forming reactions as well as oxidation reactions. In case the electrically conducting medium is a liquid such as water and ammonia, or an organic liquid such as methanol and ethanol, metal salts can be added to the conductive medium as reactive components. Metal ions can accelerate the growth of hydrophilic channels in the plastic, possibly due to a catalytic acceleration of the oxidation reactions.

According to the present invention it is now found that by means of an electric field applied over an electrically conducting medium in contact with a base material, it is possible to diffuse all kinds of specific substances into the base material for inducing new or changed properties other than ionomeric properties. Such properties comprise the physical structure, the optical properties, selective permeability for gases (membrane action), chemical properties, thermal properties, mechanical properties such as bending and tensile strength, electric properties and magnetic properties.

Accordingly the present invention provides a method of treating a base material for obtaining one or more specific properties, excluding ionomeric properties, by diffusing a specific substance into the base material, said substance directly or indirectly inducing the specific property or properties, characterized in that the base material is contacted with an electrically conductive medium, and that the specific substance is diffused into and/or reacts in the base material by means of an electric field being applied across the total of said base material, electrically conductive medium and specific substance.

It has appeared that an electric field is capable of causing substances to diffuse faster into base materials situated in said field. Faster diffusion is also understood to comprise injection. It is also understood to comprise a process in which electrochemical reactions at the base material play an essential role in the diffusion and inducing, casu quo changing, of properties. In all cases an electric field should be applied over the base material at or near the position where the change is intended. The result of such a diffusion is that the diffused substance leads to a novel or changed property. It is also possible that diffusion itself gives novel or changed properties to the base material in which the introduced substance itself does no longer make any essential contribution to said new or changed property. Said diffusion or injection roughly occurs along the field's electric field lines. The moving spirit behind this is a yes or no temporary increase of the conductivity, the capacity, or a combination of both, in said base material.

With the invention, the electric field is not limited to a certain value. Furthermore it can be a homogenous field or an inhomogenous field, such as it is caused by a needle electrode or conductive mercury droplet. The field-driven diffusion of substances to be diffused in base material already occurs at a field strength in the order of 1 millivolt/millimeter. The upper limit of the electric field is determined by the value at which the intended product would be destroyed destructively. Here, the field can be a DC direct current electric field, but for most applications an AC alternating current electric field is preferred. For example, for salts as the substance to be introduced, it has been found that the stronger the high-frequency field (up to about 50 kHz), the more effective the diffusion. Good results have been obtained with an alternating voltage field having a frequency within the range of 10 Hz–25 kHz.

The invention can be applied with various types of base materials. Thus, the base material can be of synthetic or natural polymer. The base material can furthermore consist of a ceramic or glass-like material.

U.S. Pat. No. 3,652,244 discloses a method for chemically tempering a glass material. A sheet of glass is placed within two support plates with a metal ions delivering substance as a medium between the plates and the glass sheet. The tempering is performed by heating in a furnace. By this heating metal ions from the medium, such as potassium ions, are diffused into the glass sheet. To accelerate this tempering treatment an AC generator can be connected to the (conducting) plates for applying an alternating electrical potential to the plates during the tempering treatment.

From French patent application 2,174,059 it is further known to alter selectively the diffractive index in an optical glass by ion exchangement. By this exchangement monovalent metal ions like potassium or sodium are replaced by heavier metal ions such as Tl or Cs for increasing the refractive index locally. This is performed by putting the glass plate to be treated with its bottom surface in floating contact with a bath of hot molten metal salt comprising the heavier metal ions for replacement. The top surface of said glass plate is covered by an acceptor layer capable to receive the sodium and potassium ions from the glass. A DC voltage is applied between the bath and the acceptor layer in order to enable the monovalent metal ions from the glass to be diffused into the acceptor layer whereas by the hot melt the heavier metal ions can diffuse into the glass plate, thus completing the ion exchangement in the glass.

Contrary thereto is in the method of the invention no heat involved and there is no matter of exchangement of ions but of diffusing a specific substance for inducing a specific property in a base material.

Particularly suitable, the invention it applied with a base material consisting of a composition of materials comprising a multilayer system of substances, a fractal composition of substances, or a composite. It is also possible to apply the method according to the invention to an oil or fatty substance as a base material. Finally, the base material can also be a gel or a paste.

The electrically conductive medium assures that the electric field is present on the location where, from a base material, an intended product with altered or new properties has to be manufactured. Appropriately the electrically conductive medium can be a liquid. This particularly has the advantage that the specific substance, e.g. a salt, can be solved or suspended in the liquid. The electrically conductive medium can also be a gas or a gas plasma.

Another possibility is a conductive rubber or paste. Finally, the conductive medium can also consist of a composition of conductive media.

In case of a conductive liquid as electrically conductive medium, the specific substance can be efficiently diffused in the base material directly from the liquid. In case of a gas or a gas plasma, the specific substance can also be introduced from one or more electrodes of the electrode system causing the electric field. The specific substance can further be applied on the surface or in one of the layers of the base material through which said substance must be diffused. In all of these cases, the electric field provides for an accelerated diffusion by which the intended effect and the desired property are achieved.

With the method according to the invention, it is possible to induce numerous novel properties in base materials. This concerns both physical, chemical and mechanical properties.

As for the physical structure, it has turned out that it is possible to apply a channel structure on micron and submicron scale in polyethene as base material and water as conductive medium, from which calcium salts are provided as the specific substance to be introduced.

As for the optical properties, it has turned out to be possible to introduce a light-diffusing area in various transparent substances within the base material. Further it has appeared possible, to diffuse specific substances in polyethene with the help of the electrically driven diffusion, in which said specific substances provide for, that the polyethene can be locally intensely colored by a colorant. On the other hand, with other materials it will be possible to render a substance transparent according to the method of the invention with suitable production parameters. In some cases, the combination of change in physical structure is accompanied by the production of a polarizing optical effect.

As for the chemical properties, it has turned out to be possible to provide a polymer with active groups, that are capable of reacting with intruding other substances. The novel or changed physical and chemical properties can render base materials suitable for e.g. a membrane for gases or other substances. Thus, among other things, it has turned out that polyethene can be processed in such a way, that it does let water through, but no hydrated ions, for example.

Further, polyethene can be processed in such a way, that certain gases can be intercepted, in that groups were introduced, with which said gases react. Thus, manufacturing of a gas separation filter is possible. Another possible application is the manufacture of sensors, e.g. changing colors, or having other signal functions on penetration of certain gases or other substances.

As for thermal properties, an induced change of microstructure can increase the thermal insulation value, whereas the introduction of thermally highly conductive substances can render a base material better thermally conductive. By e.g. Diffusing salt in rubber as the base material with the help of an electric field, it is achieved that the base material will be better permeable to water and as a result of that will be better thermally conductive.

As for mechanical properties, the induced change in microstructure can bring about a desired change in the base material.

As for electric properties, the method according to the invention offers numerous possibilities, such as affecting the conductivity, capacity, and the like.

As for magnetic properties, ferriferous substances and other magnetizable substances can induce novel or changed magnetic properties in a base material.

The substance to be introduced itself should induce a property directly or of indirectly, or the introduction of the substance should induce a property directly or indirectly, or a combination of both should take place. An example of a substance inducing a direct property is copper sulphate with a polyethene as base material. Once present in said base material, the resulting material is capable of capturing hydrochloric acid gas, in which the sulphate is converted to bisulphate. An example of a substance indirectly inducing a property is a substance such as copper ions, promoting the forming of oxidized groups such as carboxylate groups, in a polymer as base material. An example of a substance in which the introduction itself induces the property, is a calcium salt having e.g. polyethene as base material, in which microchannels are produced. The properties of said channels need no longer be related to the calcium salts themselves, but to the introduction thereof.

In case of the processing of a composed material as base material, the substance to be introduced can penetrate from one of the layers of said base material into another layer of the base material, also when first-mentioned layer itself would not be indicated as the electrically conductive medium. An example thereof is the processing of a composed base material consisting of a layer of graphite with additives on a polyethene layer. After applying an electrically conductive medium on the surface of the graphite layer turned away from the polyethene, selected additives—after applying an electric field across the base material consisting of graphite and said polyethene—will be capable of penetrating the polyethene from the graphite layer, as a result of which the properties at the polyethene are changed. The previously mentioned copper or calcium salts could have been mixed into the graphite layer, for example.

The end product is generally in the form of a sheet or in the form of a coating across a carrier. However, it can also be a cylinder, hollow cone or spherical shape. With a composite base material, it can also be a network of a substance within another substance. Characteristic is the fact that an electric field must have been applied across the product once. However, after that, it can have been processed further, in which the geometry and the physical structure is changed further, An example is the introduction of terminal groups as carboxylate in a polymer. When the polymer is warmed up to near the melting point, the groups will become capable of clustering. At that moment, it is possible to deform the polymer. The physical structure of the polymer having terminal groups could also change in that the terminal groups become capable of clustering. Then, after cooling down, not only the polymer has obtained another macroscopic shape, the part having the terminal groups has been changed as well, and after heating, said part has other optical properties than before. Furthermore, crystal volumes can arise, that weren't present or possible before the heating. This has appeared in polyethene, in which carboxylate groups were introduced by means of abovementioned process. After heating up to above 100° C. and cooling down, a deviating recrystallization occurred.

Base materials that can be processed according to the indicated process can be: synthetic or natural polymers, ceramics, oil- or grease-like substances, gels, pastes, glass-like substances, rubbers, liquids, coatings, compositions of materials being multilayer systems of substances, plastics or composites.

The process can be applied to large objects such as ceramic surfaces, oil films and polymer foils. However, the process can also be applied on a microscopic or submicroscopic scale on inducing properties in micro electronics components, for example.

A suitable method of inducing novel or changed properties is to have the substance to be introduced diffuse into the base material from two sides. Here, among other things, the method according to the patent application previously mentioned can be adopted. There, a liquid electrically conductive medium was mounted at both sides of a guttershaped polymer foil by means of electrodes. However, other-base materials than polymers are contemplated too, such as gels and the like, and also polymers as base material, in which, however, the final material can not be characterized as an ionomer. A supply of the substance to be introduced from one side is also possible. The latter can occur in e.g. coatings or in composed materials.

Examples of applications of the materials prepared and systems combined according to the above-mentioned process include: membranes for filtering techniques for gases, ions, liquids; products having specific optic properties; half-products in the chemical industry, suitable for follow-up reactions; substances having a built-in signal function for the presence of specific gases; magnetic plastics; obtaining adhesive layers in systems; releasing of layers; ion conductors; thermal conductors or insulators; chemical change or decomposition of oil films on water; obtaining layers and coatings having specific properties on or in components in the micro-electronics system.

What is claimed is:

1. Method of treating a base material for obtaining one or more specific properties, excluding ionomeric properties, by diffusing a specific substance into the base material, said substance directly or indirectly inducing the specific property or properties, comprising the steps:

providing a base material chosen from the group consisting of synthetic polymers, natural polymers, ceramics, oil substances, fatty substances, grease substances, gels, pastes, glass substances, rubbers, liquids, multilayer systems of substances, fractal compositions of substances, composites, and microelectronic components; and contacting the base material with an electrically conductive medium, wherein the specific substance is diffused through the surface layer and substantially into the volume of the base material by an electric field being applied across the total of said base material, electrically conductive medium and specific substance to obtain one or more of said specific properties, excluding said ionomeric properties.

2. Method according to claim 1,
   characterized in that
   the electric field is a direct current (DC) electric field with a field strength of approximately 1 millivolt/millimeter.

3. Method according to claim 1,
   characterized in that
   the electric field is an alternating current (AC) electric field with a field strength of approximately 1 millivolt/millimeter.

4. Method according to claim 3,
   characterized in that
   the alternating current (AC) electric field has a frequency in the range of 10 Hz to 25 kHz.

5. Method according to claim 1
   characterized in that
   the electrically conductive medium is a liquid.

6. Method according to claim 5,
   characterized in that
   the specific substance has been solved or suspended in the liquid.

7. Method according to claim 5
   characterized in that
   the specific substance is introduced from one or more electrodes of the electrode system providing the electric field.

8. Method according to claim 5
   characterized in that
   the specific substance has been applied on the surface or in one of the layers of the base material through which said substance is to be diffused.

9. Method according to claim 5
   characterized in that
   the electrically conductive medium consists of a composition of various conductive media.

10. Method according to
    characterized in that
    the electrically conductive medium is a gas or a gas plasma.

11. Method according to claim 10, characterized in that the specific substance is introduced from one or more electrodes of the electrode system providing the electric field.

12. Method according to claim 10, characterized in that the specific substance has been applied on the surface or in one of the layers of the base material through which said substance is to be diffused.

13. Method according to claim 1
    characterized in that
    the electrically conductive medium is a conductive rubber or paste.

14. Method according to claim 13, characterized in that the specific substance is introduced from one or more electrodes of the electrode system providing the electric field.

15. Method according to claim 13, characterized in that the specific substance has been applied on the surface or in one of the layers of the base material through which said substance is to be diffused.

* * * * *